United States Patent [19]

Koike

[11] 4,404,667
[45] Sep. 13, 1983

[54] SOUND REPRODUCING DEVICE DRIVEN BY A CONSTANT TORQUE PULL STRING TYPE SPRING AND STARTED BY SELECTIVE STARTER RODS FOR PLAYING MULTIPLE RECORD GROOVES

[75] Inventor: Eishi Koike, Sagamikara, Japan

[73] Assignee: Ozen Corporation, Tokyo, Japan

[21] Appl. No.: 353,613

[22] Filed: Mar. 1, 1982

[30] Foreign Application Priority Data

Oct. 30, 1981 [JP] Japan .............................. 56-174221

[51] Int. Cl.³ .................. G11B 17/00; A63H 3/33; G11B 3/00
[52] U.S. Cl. ..................................... 369/65; 369/31; 369/67
[58] Field of Search ............... 369/31, 65, 66, 67, 369/63

[56] References Cited

U.S. PATENT DOCUMENTS

| | | | |
|---|---|---|---|
| 3,782,732 | 1/1974 | Summerfield | 369/31 |
| 3,799,556 | 3/1974 | Watanabe | 369/31 |
| 4,150,831 | 4/1979 | Watanabe | 369/31 |

Primary Examiner—Steven L. Stephan
Attorney, Agent, or Firm—Basile, Weintraub & Hanlon

[57] ABSTRACT

A winding string, when stretched tight, will lift a speaker unit which applies a stylus pressure to a pickup so that the pickup is allowed to reverted back to the starting point of sound reproduction. The stretched string will also lift a plunger carrying a stopper block to axially advance so as to be in engagement with a retainer piece disposed on the record disc.

The plunger is normally urged by a first spring toward a direction in that the stopper block may retract away from the engagement with the retainer piece disposed on the record disc.

The advanced position of the plunger, at which the stopper block engages the retainer piece is sustained by a lever movable in a see-saw like swing motion.

The lever is actuated by the movement of an intermediate starter member initiated by the depression of any one of the selective starter rods provided in number corresponding to that of recorded grooves and thereby releases the record disc from its temporarily stopped condition.

In this manner, a locking block attached on the reverse face of the record disc engages one of the selective starter rods having advanced by depression and causes guide portion of the selected record groove to be positioned for next engagement with the pickup.

Release of the depression on the selective starter rod accompanied by its retraction causes both the intermediate starter member and a center shaft to retract due to absence of supporting, which further causes speaker unit to move downward and enables subsequent sound reproduction.

3 Claims, 5 Drawing Figures

SOUND REPRODUCING DEVICE DRIVEN BY A CONSTANT TORQUE PULL STRING TYPE SPRING AND STARTED BY SELECTIVE STARTER RODS FOR PLAYING MULTIPLE RECORD GROOVES

BACKGROUND OF THE INVENTION

1. Field of the Invention

The invention relates to a sound reproducing device having a record disc driven by a pull-string type constant torque spring and started by a plurality of selective starter rods for selectively playing a plurality of recorded grooves.

2. Description of the Prior Art

Heretofore, several sound reproducing devices for playing a plurality of recorded grooves using pull-string type constant torque spring have been provided.

The manner of selective sound reproduction adopted in most of these devices is one which rotate the record disc to the position where the specific groove selected for playing can engage the pickup of the device, by means of an indexing member disposed freely rotatable on the upper deck of the casing.

According to this kind of device, selection of the sound item to be reproduced is limited to such a usage as to fix the indexing member to the sound items shown on the upper deck.

Accordingly, this type of device cannot be applied to other uses, for example, where the device is incorporated in the body of a doll and yet is required to play various recorded items by selectively depressing the selective starter rod.

In view of this drawback, it has long been desired to provide a sound reproducing device relying on a pull-string type constant torque spring and yet capable of reproducing a plurality of recorded grooves by a plurality of selective starter rods.

However, such a device requires a special construction for temporarily stopping the record disc to keep a time interval necessary to manipulate a desired selective started rod after releasing the pull-string successively to wind up the constant torque spring.

However, no such mechanism for practical use has yet been provided, and therefore, no satisfactory sound reproducing device using a plurality of selective starter rods has been carried into practice.

SUMMARY OF THE INVENTION

This invention aims to solve such pending problems encountered in the conventional sound reproducing devices.

Accordingly, an object of the invention is to provide a means for temporarily stopping the record disc until the starting operation for selective playing has been done and is suitable for a reproducing device for selectively playing one of the recorded grooves by using selective starter rods.

Another object of the invention is to provide a sound reproducing device for playing multi-track record disc which prevents undesirable rotation of the record disc from the time when a pull-string is released from its stretched state in pulling action to the time when a selected starting rod has been manipulated for next optional playing.

According to the present invention, a pull-string when stretched will lift a speaker unit upward which has been imparting stylus pressure to the record disc, so that the pickup can return to the starting point of sound reproduction.

Concurrently, a plunger carrying a stopper block for temporarily locking the undesired rotation of the record disc is axially advanced so as to be in contact with a retainer piece attached to the record disc.

The plunger is normally urged downward by a first spring so that its stopper block moves away from the retainer piece of the record disc.

Advanced position of the plunger mentioned above where the stopper block is being in contact with the retainer piece is maintained by a lever disposed for locking action by its see-saw like swing motion.

The lever is also constructed to release the plunger from its locked state at an advanced position for temporarily stopping the record disc, when an intemediate starter member is moved by the depression of any one of the selective starter rods provided in number corresponding to a plurality of recorded grooves in the record disc.

Then the record disc is able to rotate for a while until its locking block engages the selective starter rod having been advanced by the pushing for selecting the desired recorded item to be played, where the guide portion of the selected record groove is positioned to be in engagement with the pickup on subsequent rotation.

If a depression of the selective starter rod is released, the rod will retract accompanied by retraction of both the intermediate starter member and the center shaft of the record disc, which in turn enables lowering of the pickup for applying necessary stylus pressure to the pickup to start a playing sequence.

In this way, advancement of any desired one of the selective starter rods corresponding to the number of recorded grooves can be done very readily at the operator's option.

DETAILED DESCRIPTION OF THE EXEMPLARY EMBODIMENTS

Figure 1:
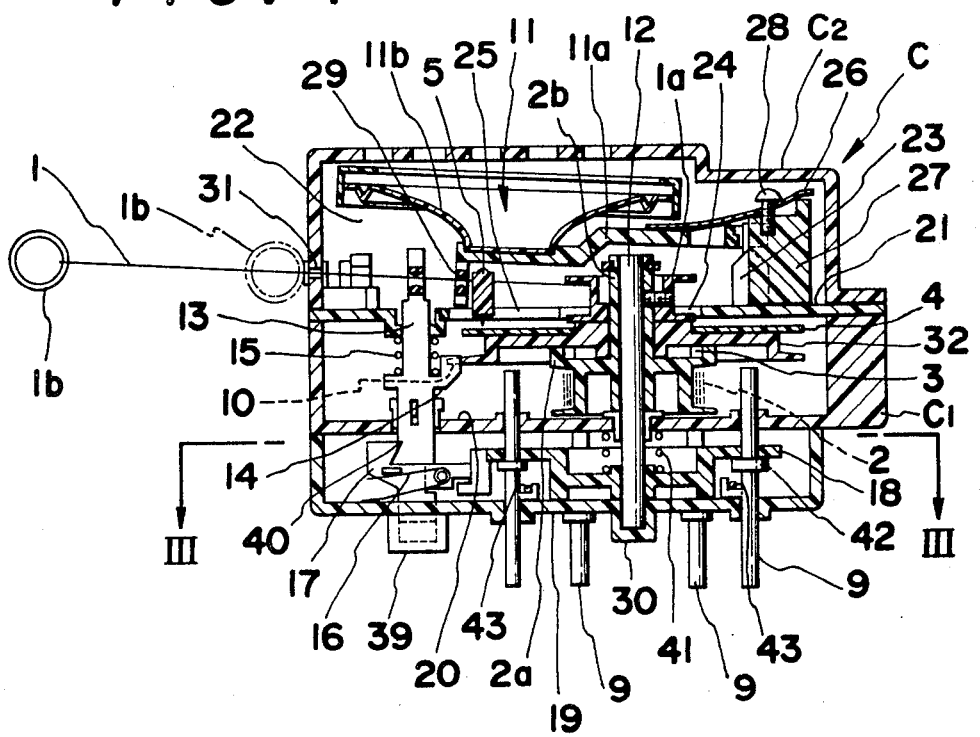
FIG. 1 and FIG. 2 are cross-sectional elevations showing the construction and operation of the multi-groove sound reproducing device as an exemplary embodiment of the invention, respectively.
Figure 2:
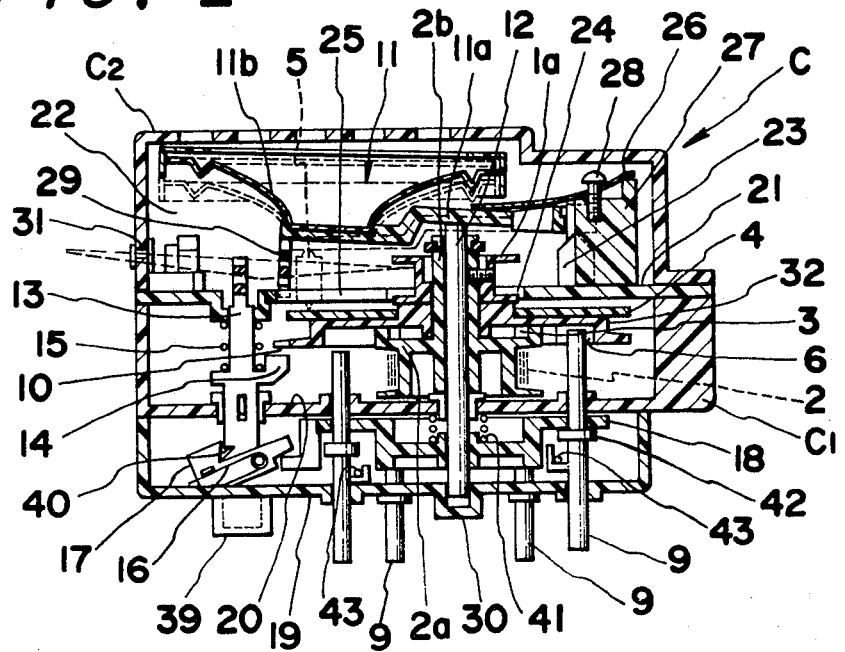

FIG. 1 and FIG. 2 show cross-sections of the multi-groove sound reproducing device so that the operation of the device may be clearly understood.

A casing C consists of a chassis C1 and a housing C2 that is fixedly placed on the chassis C1. The chassis C1 is of two compartment type and its base plate 19 is spaced apart from a middle deck 20.

Upper part of the chassis C1 is covered by an upper deck 21, upon which the housing C2 is fixedly attached to constitute a speaker box 22.

On the upper deck and within the housing C2 a speaker unit 11 and a pickup 5 are swingably mounted.

The speaker unit 11 consists of a sound transmitting member 11a and an upwardly facing speaker cone 11b fixed on one end of the upper face of the sound transmitting member 11a.

The other end of the sound transmitting member 11a is branched in horizontal direction, the branched ends of which are swingably supported by holding posts 23 provided on the upper deck 21 capable of being swung upward and downward.

The pickup 5 is received at its base end by a post (not shown) provided on the upper deck 21 such that it can be swung in horizontal direction and is normally urged by a return spring (not shown) toward the starting point of sound reproduction (near the outer periphery of the record disc in this exemplary embodiment) and toward the direction to be lifted apart from the record face.

The speaker unit 11 is placed, at the lower face of the upwardly and downwardly swung portion of the sound transmitting member 11a, on the pickup 5. Accordingly, the pickup 5, during its sound reproducing sequence, travels under slidable contact with the sound transmitting member 11a.

At the central part of the upper deck 21, a circular aperture 24 and an oblong hole 25 are formed such that the oblong apertures extends contiguous to the circular aperture 24 and along the locus of the swing motion of the pickup 5.

Thus the pickup 5 can advance downward passing through the oblong hole 25 and further beyond the lower side of the upper deck 21.

In the drawings, 26 is a stylus pressure spring of sheet metal type, one end of which is fixed on a supporting post 27 disposed on the upper deck 21, while the other end is placed so as to resiliently contact the junction of the sound transmitting member 11a and being adjustable by a set screw 28.

In the drawings, 29 denotes a projection 29 depending from the swingable tip of the sound transmitting member 11a and having a hole through which a winding string 1 passes.

A concave thrust bearing hole 30 is disposed on the bottom plate 19, into which a center shaft 12 for holding the record disc is received capable of being advanced or retracted.

The center shaft 12 extends passing through and is radially received at its intermediate portion by the middle deck 20 and further extends upward.

Around the center shaft 12, one reel 2a for taking up a constant torque spring 2 is attached, at a position between the upper deck 21 and the middle deck 20, capable of being freely movable in both axial and rotational directions.

This reel 2a has an integrally formed sleeve 2b which extends upwardly along the center shaft 12 beyond the upper deck 21.

The other reel 1a for taking up the winding string 1 is fixed around the upper part of the sleeve 2b being integral with the sleeve 2b in both axial and rotational movement.

Operator's pulling of the winding string 1, will rotate the reel 1a resulting in rotation of the reel 2a for winding the constant torque spring 2 around it.

The winding string 1 passes through a hole 31 opened through the side face of the housing C2, and when the winding string 1 is fully taken up around the reel 1a by the constant torque spring, a pull ring 1b abuts the rim of the hole 31 and keeps the winding string 1 in a stretched state.

A turn table 32 is held freely rotatable around the sleeve 2b at the position above the reel 2a but below the upper deck 21. The record disc 4 is fixed on the turn table 32.

Figure 4:
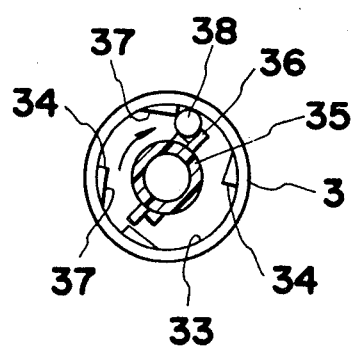
FIG. 4 is a plan view of a one-way clutch of the device.

Between the turn table 32 and the reel 26, a one-way clutch 3 having a construction as shown in FIG. 4 is disposed.

The one-way clutch, as shown in FIG. 4, of an annular guide piece projecting upward from the upper face of the reel 2a of the constant torque spring having a circular inner guide face 33, a plurality of locking faces 34 radially and inwardly projecting from the guide face 33 and facing against the direction of rotation of the record disc 4 and a plurality of slant faces 37 each being inclined outwardly from the top of respective locking face 34 toward the guide face 33; a pair of oppositely projecting pieces 36 projecting radially and outwardly from a boss provided on the reverse (lower) face of the turn table 32 but having a length not sufficient to reach the top of the locking face 34; a free roller 38 received within the space of the guide piece defined between the guide face 33 and the boss 35 and capable of transmitting rotational force of the constant torque spring to the turn table 32 through the boss 35 by means of being caught between the locking face 34 and the opposedly projecting piece 36 only when the locking face 34 rotates together with the reel of the constant torque spring in the direction of sound reproduction (shown by arrow line) and transmit, via the boss 35 the rotational force of the constant torque spring 2 to the turn table 32.

It is to be noted, however, that when the reel is rotated in the direction of taking up the constant torque spring (opposite to arrow line), the roller 38 is freely movable by running over the slant face 37 without imparting any rotational force to the turn table.

As shown in FIGS. 1 and 2, a locking block 6 (see FIG. 2) projects axially downward from the back (reverse) face of the turn table 32, also a radially extending retainer piece 10 is disposed at the peripheral rim of the turn table 32.

Though not shown in the drawings, the turn table 32 is connected via belt drive to a governor positioned alongside the turn table.

On the base plate 19, of the chassis C1 a concave hole 39 is formed to receive a plunger 13 allowing its axial movement upward and downward.

The plunger 13 has such a length that extends upward alongside the periphery of the turn table 32, passing through the middle deck 20 and further the upper deck 21, and the upper end of which may cross the stretched winding string 1. At the upper end of the plunger 13 a string hole is opened through which the string 1 is passed as shown in the drawings.

At the middle part of the plunger 13, there is a stopper block 14 which is formed being projected radially and upwardly from the plunger so as to be able to engage the retainer piece 10 disposed on the turn table 32 when the plunger 13 is advanced upward.

The plunger 13 is normally urged by a first spring 15 toward the direction of its retraction (downward) and is provided, at the portion below the middle deck 20, with a notch having a downwardly facing notch face 40.

On the base plate 19, there is a lever 17 supported for see-saw like swing motion and is normally urged by a second spring 16 ready for meshing with the notch face 40.

When the plunger 13 is advanced by being pulled upward against the force of the first spring 15 by the stretched string 1, the lever 17 is allowed to enter into the notched portion and firmly meshes with the notch face 40 and sustains the plunger 13 at its advanced position (see FIG. 1). Positioned between the base plate 20 and the middle deck 21, an intermediate starter member 18 is fixedly disposed around the center shaft 12 to move axially integral with the center shaft.

Figure 3:
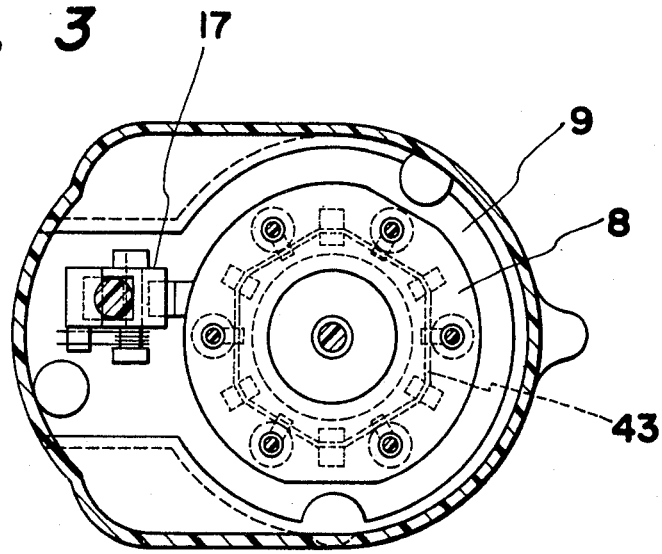
FIG. 3 is a cross-section of the device taken along line III—III of FIG 1.

This intermediate starter member 18, as particularly shown in FIG. 3, is of a circular disc shape and is attached with a projected member engageable with the lever 17 at its one side opposite to the othe side at which it engages the plunger 13, so that the lever 17 can be scooped up by the upward movement of the intermediate starter member.

As shown in FIGS. 1 and 2, the intermediate starter member 18 and the center shaft 12 together are normally urged by a third spring 41 toward the direction of their retraction.

As shown also in FIGS. 1 and 2, a plurality of selective starter rods 9 are disposed passing through the base plate 19, the middle deck 21 and also the intermediate starter member 18 being capable of advancing or retracting and yet the tip of the starter rod when advanced, is enbled to cross and contact the locking block 6 attached beneath the reverse face of the turn table 32.

An integrally formed flange 42 of each selective starter rod 9 will hold the intermediate starter member 18 from lower side so as to be able to advance together with the intermediate starter member 18, when one of the selective starter rod is advanced by pushing operation thereto.

Figure 5:
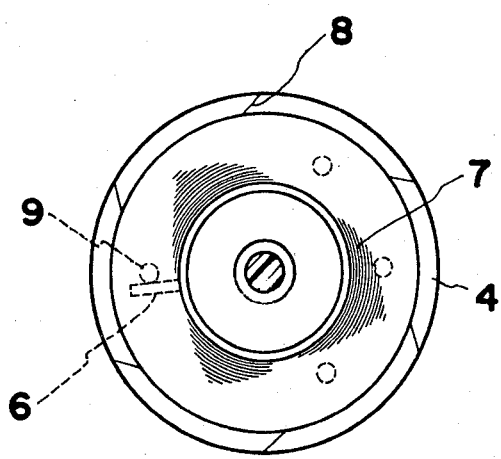
FIG. 5 is a plan view of a record disc of the sound reproducing device of the invention.

A shown by FIG. 5, the device has six selective starter rods 9, corresponding to the number of recorded grooves, for example, six grooves in this embodiment and is positioned to maintain a predetermined relationship with respect to the position of the pickup 5 for starting sound reproduction so as to stop the rotation of the record disc 4, so that the introductory portion namely, the guide portion 8 of the selected specific record groove is positioned to allow into which the pickup 5 to enter, when a specific selective starter rod 9 engages the locking block 6.

The selective starting rods 9, as shown in FIG. 3, are normally held at its retracted position under resilient force given by a ring shaped rubber bands 43.

The operation of the illustrated embodiment will now be explained. During the time when the winding string 1 is being pulled as shown by the solid line for taking up the constant torque spring 2 and also at the time when the pull ring 1b rests at the position shown by the dash and dot line after having finished a playing, the string 1 is maintained being tightly stretched accompanying both the speaker unit 11 and the plunger 13 being lifted upward.

At this point, the sound transmitting member 11a of the speaker unit 11 is in the position lifted up apart from the record disc 4, so that no stylus pressure is imparted to the pickup 5.

This allows the pickup 5 to return to and rest at the starting point of sound reproduction also being lifted up apart from the record disc 4.

Since the plunger 13 is kept advanced, the stopper block 14 engages the retainer piece 10 for temporary stopping, accordingly, the rotation of the record disc 4 by the constant torque spring 2 is prevented from its occuring.

The plunger 13 is kept advanced by its meshing with the lever 17.

Pushing of any one of the selective starter rods 9 will advance the intermediate starter membe 18 which, in turn, advances the center shaft 12 and thus scoops up the lever 17 so as to be released from meshing with the plunger 13, while the upper end of the center shaft still acts, for a short period of time, to support speaker unit 11 and prevent it from lowering.

However, shortly thereafter the plunger 13 starts retraction by means of the first spring 15 resulting in escapement of the stopper block 14 from its engagement with the retainer piece 10 of the turn table 32 and permits rotation of the turn table and record disc 4 together.

However, since the upper end of the selective starter rod 9 is advanced so as to project to cross the rotational plane of the locking block 6 projecting downward from the reverse face of the turn table 32, the turn table 32 together with the record disc 4 stops rotation at the piston where the locking block 6 abuts the selective starter rod 9 being projected.

At this moment, the guide portion 8 of the specifically selected groove of the recorded grooves 7 is positioned so as to be engageable with the pickup 5.

Release of the depressed selective starter rod 9 will allow its upper end to retract from the rotational plane of the locking block 6 and to release it from their mutual engagement.

Then, the turn table 32 and the record disc 4 together start rotation and the intermediate starter member 18 is allowed to retract by the resilient force of the third spring 41 accompanying retraction of the center shaft 12.

Due to loss of supporting force given by the center shaft 12, the speaker unit 11 together with the pickup 5 are lowered as shown by the dash and dot lines shown in FIG. 2, respectively, so as to be engaged with the record disc 4 with the necessary pressure.

In this way, the pickup 5 is able to engage the guide portion of the specific record disc selected for playing the desired item.

Upon completion of the sound reproduction, the winding string 1 is tightly stretched and lifts up both the speaker unit 11 and the plunger 13, then its notched face 14 will move passing over the lever 17 and allows entering of the lever 17 into the notched portion thereby the plunger 13 is maintained at its advanced position.

In the manner mentioned above, selective sound reproduction sequence of the device can be performed.

I claim:

1. A sound reproducing device for selectively playing any desired one of a plurality of recorded grooves comprising, a constant torque spring wound by a winding string, a record disc driven by said constant torque spring capable of rotating only in a direction of sound reproduction and a pickup urged by a return spring to its directions upward away from said record disc and to the starting point of sound reproduction, wherein the improvement comprises:

a locking block projecting from the reverse face of the record disc and being rotatable together with said record disc;

a plurality of selective starter rods corresponding to the number of recorded grooves each of which rods being positioned at a location in a predetermined relationship to the guide portion of each record groove and capable of being advanced to be engaged with said locking block when depressed;

a retainer piece disposed on the periphery of the record disc being rotatable together with the record disc for temporarily stopping rotation of the record disc;

a speaker unit swingably supported at its one end and capable of imparting stylus pressure at the lower face of the other end;

a center shaft for receiving said record disc capable of being axially advanced to lift said speaker unit upward against the resilient force given by said stylus pressure;

a plunger upstanding alongside said record disc and being axially movable parallel to said center shaft;

a stopper block projecting from the side periphery of said plunger for engagement or disengagement with said retainer piece of the record disc for effecting temporary stopping or releasing of the record disc by the respective advancing or retracting motion of said plunger;

a first spring for urging said plunger to the direction of retraction of said stopper block from the engagement with said retainer piece of the record disc;

a lever swingably supported for see-saw like movement being urged by a second spring for locking said stopper block may engage said retainer piece of the record disc;

an intermediate starter member fixed around said center shaft capable of advancing or retracting together with said center shaft and being placed in engagement with said lever to swingably move the lever against the resilient force of the second spring thereby releases said plunger from its engagement with said lever caused by the advance of any one of said selective starter rod;

said winding string is passed correlated to both the speaker unit and said plunger so that the winding string when stretched under tension during the time of winding and after the sound reproduction has been finished, lifts said speaker unit to move away from the record face and releases the stylus pressure imparted thereon and causes said plunger to advance against the resilient force of the first spring so as to engage said stopper block with said retainer piece of the record disc, whereby release of the depression of said selective starter rod allows its retraction resulting in both application of stylus pressure to said pickup and the rotation of the record disc for starting sound reproduction.

2. A sound reproducing device for selectively playing any desired one of a plurality of recorded grooves as claimed in claim 1; wherein said speaker unit consists of a sound transmitting member swingably supported at its one end for upward and downward swinging and engaging at the lower face with the upper part of said pickup and a speaker cone fixedly attached on said sound tansmitting member.

3. A sound reproducing device as claimed in claim 1; wherein said winding string passes through both a hole formed through a projection depending from said sound transmitting member and a through hole formed transversing the upper end portion of said plunger.

* * * * *